United States Patent
Han et al.

(10) Patent No.: US 10,038,665 B2
(45) Date of Patent: Jul. 31, 2018

(54) REDUCING BROADCAST FLOODING IN A SOFTWARE DEFINED NETWORK OF A CLOUD

(71) Applicant: International Business Machines Corporation, Armonk, NY (US)

(72) Inventors: Peng Han, Beijing (CN); Jun Jie Nan, Beijing (CN); Hong Jun Tu, Beijing (CN); Yue Yu, Beijing (CN); Hua Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 14/832,242

(22) Filed: Aug. 21, 2015

(65) Prior Publication Data

US 2016/0057098 A1 Feb. 25, 2016

(30) Foreign Application Priority Data

Aug. 21, 2014 (CN) .......................... 2014 1 0415851

(51) Int. Cl.
*G06F 9/455* (2018.01)
*H04L 29/12* (2006.01)
(Continued)

(52) U.S. Cl.
CPC ........ *H04L 61/103* (2013.01); *G06F 9/45558* (2013.01); *H04L 41/0823* (2013.01);
(Continued)

(58) Field of Classification Search
CPC . H04L 47/22; H04L 61/2015; H04L 61/2061; H04L 61/103; H04L 67/1036;
(Continued)

(56) References Cited

U.S. PATENT DOCUMENTS 7,116,672 B1 10/2006 Sivakumar
7,490,351 B1 2/2009 Caves et al.
(Continued)

FOREIGN PATENT DOCUMENTS

CN 103167006 A 6/2013
CN 103200069 A 7/2013
(Continued)

OTHER PUBLICATIONS

Boteanu, Victor et al., "Minimizing ARP traffic in the AMS-IX switching platform using OpenFlow", https://www.os3.nl/_media/2012-2013/courses/rp2/p57_report.pdf, Jul. 22, 2013, 27 pages.
Varis, Nuutti et al., "Minimizing ARP Broadcasting in TRILL", 2009 IEEE GLOBECOM Workshops, Honolulu, HI, Nov. 30, 2009-Dec. 4, 2009, 6 pages.

*Primary Examiner* — Salvador E Rivas
(74) *Attorney, Agent, or Firm* — Stephen R. Tkacs; Stephen J. Walder, Jr.; Richard A. Wilhelm

(57) ABSTRACT

A mechanism is provided for reducing network load in a software defined network. The mechanism is executed by a virtual machine hypervisor. The mechanism receives a network broadcast request sent by a source virtual machine node; acquires a first destination address in the network broadcast request; and reads a predefined mapping rule of the first destination address and a second destination address. An address of a node in the software defined network is configured by using the predefined mapping rule. The mechanism derives the second destination address corresponding to the first destination address according to the mapping rule. The mechanism responds to the network broadcast request by using the derived second destination address.

20 Claims, 4 Drawing Sheets

(51) Int. Cl.
*H04L 12/24* (2006.01)
*H04L 12/761* (2013.01)
*H04L 12/741* (2013.01)
*H04L 12/40* (2006.01)
*H04L 12/715* (2013.01)

(52) U.S. Cl.
CPC ........ *H04L 12/40097* (2013.01); *H04L 45/16* (2013.01); *H04L 45/64* (2013.01); *H04L 45/74* (2013.01); *H04L 61/2015* (2013.01); *H04L 61/6004* (2013.01); *H04L 61/6022* (2013.01)

(58) Field of Classification Search
CPC ......... H04L 29/12028; H04L 12/40097; G06F 9/45558
See application file for complete search history.

(56) References Cited

U.S. PATENT DOCUMENTS

| | | | | |
|---|---|---|---|---|
| 2013/0124712 | A1* | 5/2013 | Parker | H04L 41/5038 709/224 |
| 2015/0117454 | A1* | 4/2015 | Koponen | H04L 61/2532 370/392 |
| 2015/0326524 | A1* | 11/2015 | Tankala | H04L 61/103 709/245 |

FOREIGN PATENT DOCUMENTS

| | | |
|---|---|---|
| CN | 103209225 A | 7/2013 |
| CN | 103248724 A | 8/2013 |
| CN | 103401954 A | 11/2013 |
| EP | 2362587 B1 | 6/2013 |
| WO | WO2007/143833 A1 | 12/2007 |
| WO | WO2014/115157 A1 | 7/2014 |

* cited by examiner

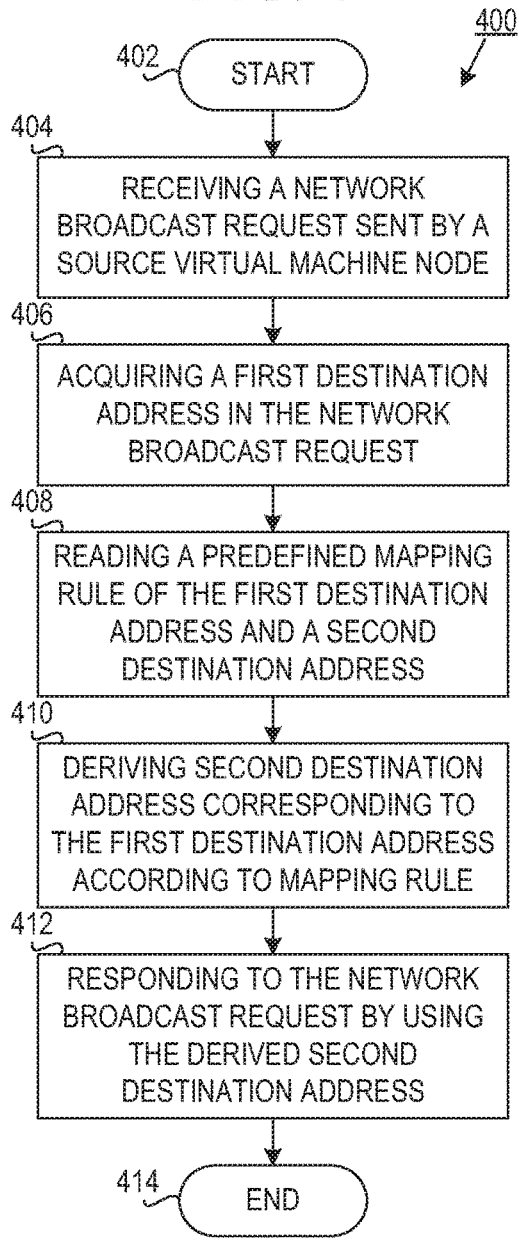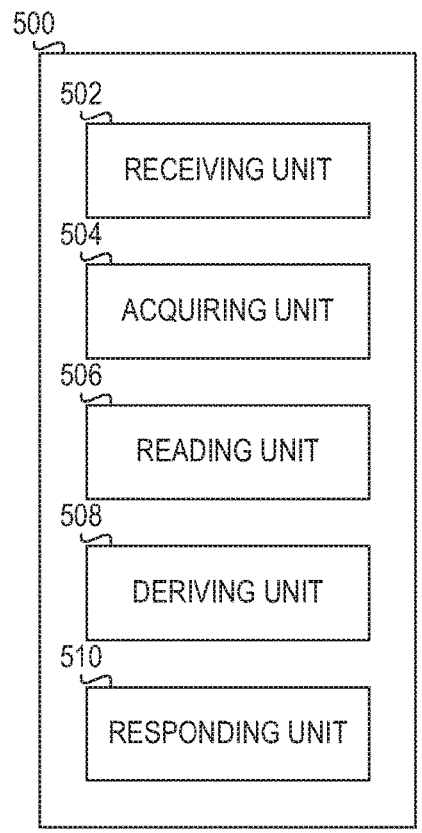

REDUCING BROADCAST FLOODING IN A SOFTWARE DEFINED NETWORK OF A CLOUD

BACKGROUND

Embodiments of the present invention relate to Software Defined Network (SDN), and more specifically, to reducing broadcast flooding in an SDN of a cloud.

Software Defined Network (SDN) is a network virtualization technology which, by transferring control plane of a router into a controller, separates control plane function from a switching Application Specific Integrated Circuit (switching ASIC) by manner of software, and makes the switching ASIC dedicated to data plane function. Such new network architecture as SDN allows a network administrator to re-plan the network with program in a central controlled manner without changing hardware devices, which not only provides a new method for controlling network traffic, but also offers a good platform for core network and application innovation. Because the SDN possesses features such as powerfulness and flexibility, cloud computing center under current environment has increasingly employed the SDN to dynamically define network topology as needed for communication between nodes.

There are mainly two approaches for using current SDN in data link layer of an Open Systems Interconnection (OSI) Reference Model, one is to use a point to point tunnel, such as Generic Routing Encapsulation (GRE) tunnel adopted by OpenvSwitch, and the other is to use multicast+point to point tunnel, for example, a VxLAN tunnel. No matter which approach is used, if there are a large number of nodes in a network, it often leads to network broadcast storm during network broadcast (e.g., Address Resolution Protocol (ARP)), because there are often a large number of nodes in a cloud computing environment, this tends to be more prominent in a cloud computing environment. For example, as to the GRE tunnel employed by OpenvSwitch in a cloud computing environment, since it is necessary to maintain one tunnel between every two nodes, and a broadcast packet needs to be sent to all the tunnels during network broadcast, it will cause heavy network load, which further leading to network broadcast storm.

SUMMARY

Thus, there is a need in the art for a technical solution capable of reducing network load in a software defined network.

According to one illustrative embodiment, there is provided a method for reducing network load in a software defined network, comprising: receiving a network broadcast request sent by a source virtual machine node; acquiring a first destination address in the network broadcast request; reading a predefined mapping rule of the first destination address and a second destination address, wherein an address of a node in the software defined network is configured by using the predefined mapping rule; deriving the second destination address corresponding to the first destination address according to the mapping rule; and responding to the network broadcast request by using the derived second destination address.

According to another illustrative embodiment, there is provided a virtual machine management system for reducing network load in a software defined network, comprising: a receiving unit configured to receive a network broadcast request sent by a source virtual machine node; an acquiring unit configured to acquire a first destination address in the network broadcast request; a reading unit configured to read a predefined mapping rule of the first destination address and a second destination address, wherein an address of a node in the software defined network is configured by using the predefined mapping rule; a deriving unit configured to derive the second destination address corresponding to the first destination address according to the mapping rule; and a responding unit configured to respond to the network broadcast request by using the derived second destination address.

According to another illustrative embodiment, there is also provided a computer program product for reducing network load in a software defined network.

With the method, system and computer program product of the illustrative embodiments, network load in a software defined network can be significantly reduced, so that the problem of network broadcast storm existed in the art is effectively solved.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4 depicts a flowchart of a method 400 for reducing network load in a software defined network according to an embodiment of the present invention;

FIG. 5 depicts a block diagram of a virtual machine management system for reducing network load in a software defined network according to an embodiment of the present invention.

DETAILED DESCRIPTION

Figure 1:
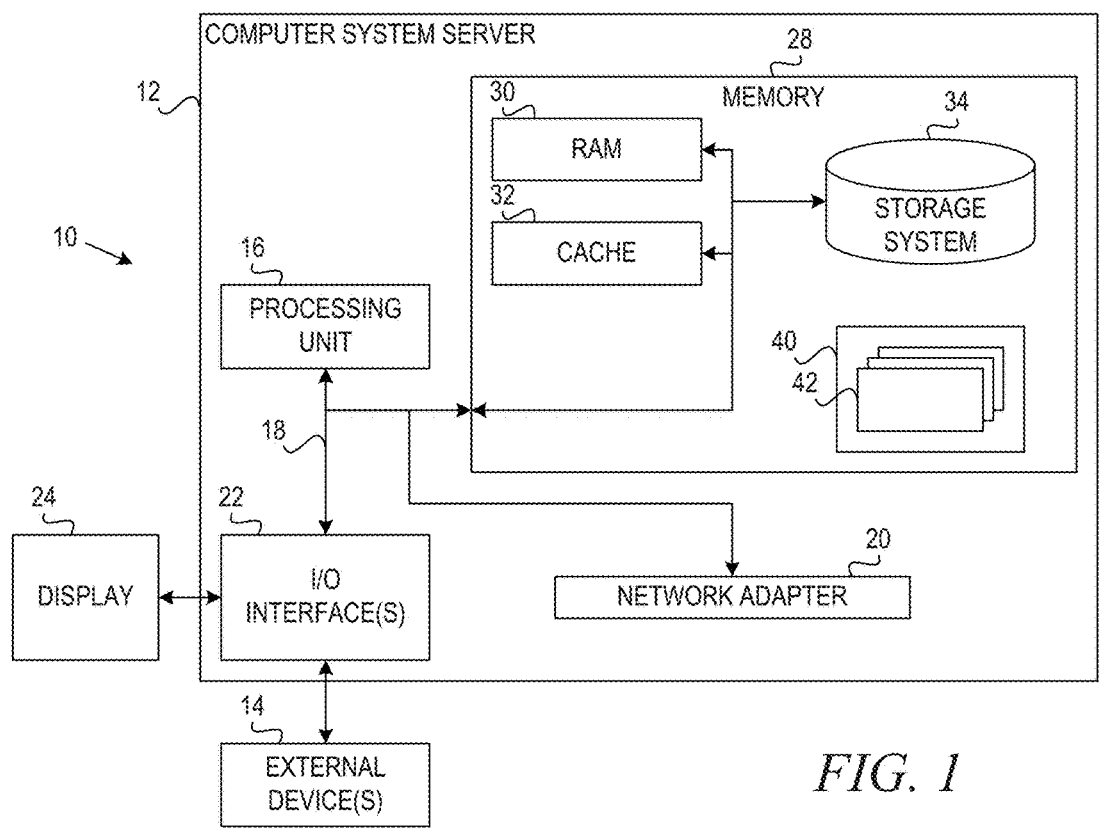
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
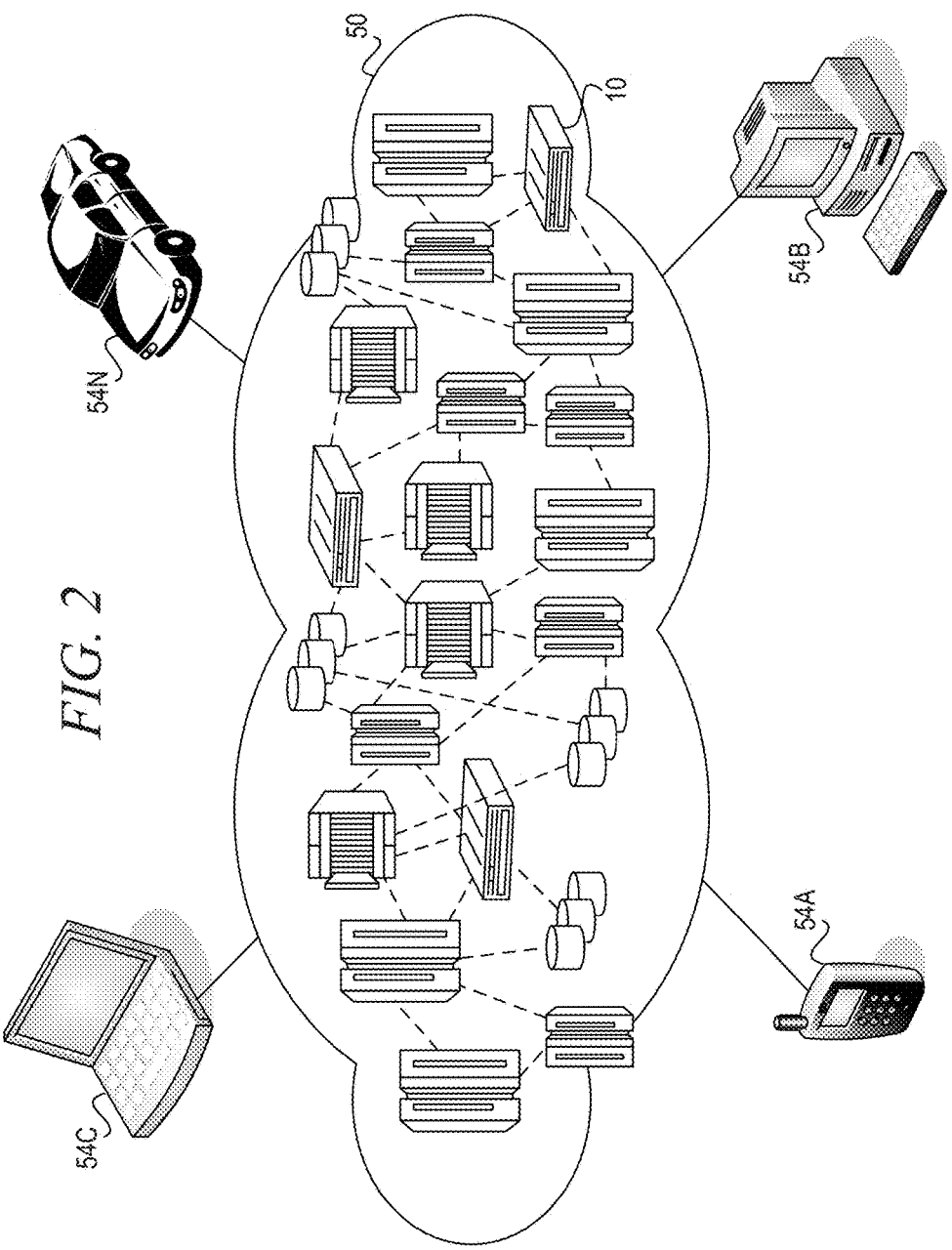
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
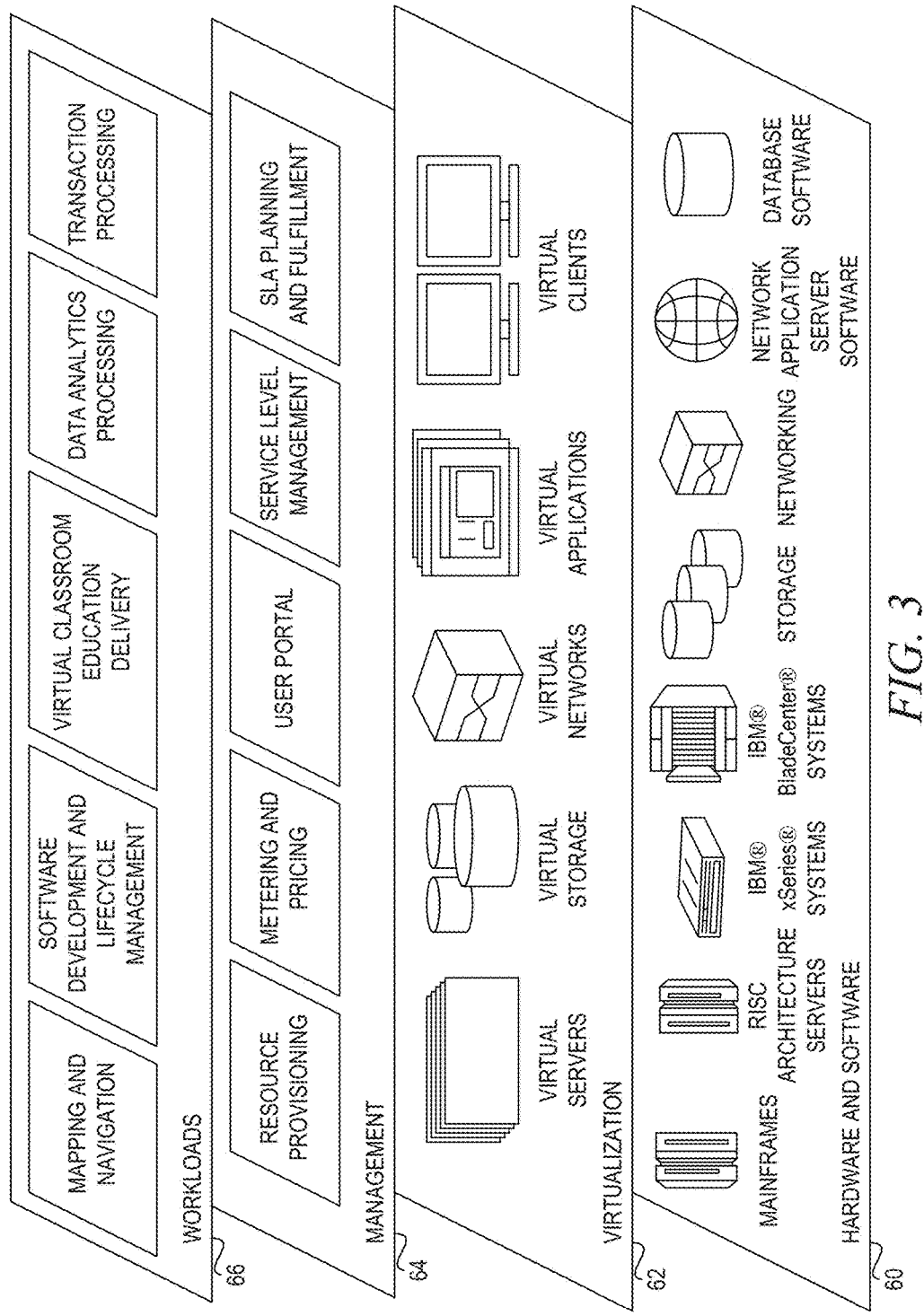
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks: virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

With reference now to FIG. 4, a flowchart of a method 400 for reducing network load in a software defined network according to an embodiment of the present invention is shown. The method 400 is executed by a virtual machine hypervisor, and starts at step 402.

Next, in step 404, the virtual machine hypervisor receives a network broadcast request sent by a source virtual machine node. Next, in step 406, the virtual machine hypervisor acquires a first destination address in the network broadcast request. Next, in step 408, the virtual machine hypervisor reads a predefined mapping rule of the first destination address and a second destination address. The software defined network is configured by using the predefined mapping rule. Next, in step 410, the virtual machine hypervisor derives the second destination address corresponding to the first destination address according to the mapping rule. Next, in step 412, the virtual machine hypervisor responds to the network broadcast request by using the derived second destination address. Then, the method 400 ends in step 414.

According to one embodiment, the network broadcast request is an Address Resolution Protocol (ARP), the first destination address is a destination IP address and the second destination address is a destination MAC address.

According to one embodiment, the network broadcast request is a Dynamic Host Configuration Protocol (DHCP), the first destination address is a destination MAC address and the second destination address is a destination IP address.

According to one embodiment, the predefined mapping rule of the first destination address and the second destination address is that: the second destination address may be directly derived from the first destination address.

According to one embodiment, the predefined mapping rule of the first destination address and the second destination address is that: the second destination address may be derived from the first destination address through a predefined conversion.

The above embodiments will be described below by taking ARP as an example; it should be appreciated that, the present invention is applicable to any network broadcast request for address resolution that might cause broadcast storm, such as Reverse Address Resolution Protocol (RARP), Dynamic Host Configuration Protocol (DHCP) and so on.

First, upon network initialization, a node in the software defined network is configured by using a predefined mapping rule of an IP address and a MAC address.

According to one embodiment, the mapping rule is that: the second destination address may be directly derived from the first destination address, wherein the first destination address may be an IP address or a MAC address. Specifically, a node in the software defined network is configured according to the mapping rule in the following manner: for a node, the last four digits in the MAC address thereof are just the IP address of that node (the first two digits of the MAC address is a corresponding virtual network number of the node). Correspondingly, the MAC address is derived by directly complementing the virtual network number before the IP address of that node. For example, if MAC address of a node is 00:01:09:6E:33:64, then IP address of that node is 09.6E.33.64, which, as converted into decimal, is 9.110.51.100. Correspondingly, if IP address of a node is 9.110.51.100, and virtual network number of a local network where it is located is 00:01, then MAC address of that node is 00:01:09:6E:33:64.

According to one embodiment, the mapping rule is that: the second destination address may be derived from the first destination address through a predefined conversion, wherein the first destination address may be an IP address or a MAC address. Specifically, a node in the software defined network is configured according to the mapping rule in the following manner: for a node, IP address of that node is derived by performing a predefined conversion on the last four digits in a MAC address thereof (the first two digits of the MAC address is corresponding virtual network number of that node). Correspondingly, the MAC address is derived by performing the predefined conversion on the IP address of that node and complementing the virtual network number before the derived result.

According to one embodiment, the predefined conversion may be negation (the negation meets specification of IP address and MAC address), i.e., for a node, if MAC address thereof is AA:BB:CC:DD:EE:FF, then IP address of that node may be derived by negating the last four digits (that is, CC.DD.EE.FF) of the MAC address. Correspondingly, MAC address of that node is derived by complementing a virtual network number AA:BB before the result derived by negating the IP address of that node.

For example, if MAC address of a node is 00:01:09:6E:33:64, then according to the predefined mapping rule, and by negating the last four digits (that is, 09.6E.33.64 (1001.1101110.110011.1101000)) of the MAC address of that node, IP address thereof is derived as 110.10001.1100.10111, which, by converting to decimal, is 6.17.12.23. Correspondingly, if IP address of a node is 6.17.12.23, and virtual network number of a local network where it is located is 00:01, by negating the IP address (110.10001.1100.10111) of that node, and complementing the virtual network number before the derived result (1001.1101110.110011.1101000), MAC address of that node is derived as 00:01:09:6E:33:64.

In addition to the above-described manners, the predefined conversion may also be other possible manners, as long as they can meet specification of MAC address and IP address.

After initialization, since a node in the software defined network is configured by using the predefined mapping rule of IP address and MAC address, as long as one of the IP address and the MAC address is known, the other can be derived.

One embodiment will be further described below in combination with the ARP.

In a cloud computing environment, a node in a software defined network is a virtual machine, which may be referred to as a virtual machine node herein. Suppose IP address of a source virtual machine node that needs to conduct communication is 172.60.0.1, corresponding MAC address is 00-60-AC-3C-00-01, and it intends to communicate with a destination virtual machine node with IP address of 172.60.0.4. To this end, the source virtual machine node must first lookup MAC address of a matching destination virtual machine node in its own local ARP cache. If the local ARP cache of the source virtual machine node does not have the MAC address of the matching destination virtual machine node, the source virtual machine node needs to broadcast an ARP request frame to all the nodes in the local network, to acquire MAC address of the destination virtual machine node. The ARP request frame comprises the IP address and the MAC address of the source virtual machine node as well as the IP address of the destination virtual machine node, and MAC address field of the destination virtual machine node is FF:FF:FF:FF:FF:FF. Different from the conventional manner where all the nodes on the local network receive the broadcasted ARP request and check whether the received ARP request matches with their own IP addresses, according to one embodiment of the present invention, it is a virtual machine hypervisor that receives the ARP request sent by the source virtual machine node, and acquires IP address of the destination virtual machine node in the ARP request. Then, the virtual machine hypervisor reads a predefined mapping rule of the IP address and the MAC address, and according to that mapping rule, derives MAC address corresponding to the IP address of the destination virtual machine node. For example, if the mapping rule is that a MAC address is derived by directly complementing a virtual network number before IP address of that node, then the MAC address of the destination virtual machine node is derived by directly complementing the virtual network number before the IP address of that node. Then the virtual machine hypervisor responds to the ARP request by using the derived MAC address of the destination virtual machine node. Thus, the broadcasted ARP request is received by the virtual machine hypervisor and responded to directly without being delivered to the local network.

With the above embodiment, in case of being in a same broadcast domain, a network broadcast request is received by a virtual machine hypervisor and responded to directly, which greatly decreases number of broadcast packets delivered to a local network, therefore, network load is greatly reduced and possibility of network storm can be reduced.

According to one embodiment, an ARP request sent by a source virtual machine node may be received by a daemon running on a virtual machine hypervisor, and responded to by using a derived MAC address of a destination virtual machine node. Specific implementation thereof may be as follows:

For example, in case that the mapping rule of an IP address and an MAC address is that the MAC address is derived by directly complementing a virtual network number before the IP address of a node, an ARP response may be made simply by using a Linux-based bridging firewall tool ebtables:

ebtables -t -nat -A PREROUTING -p arp -arp -opcode Request --arp-ip-dst CC.DD.EE.FF -j arpreply -arpreply --mac AA:BB:CC:DD:EE:FF For example, ARP broadcast packets may be intercepted by using ebtables hooks:

ebtables -A OUTPUT -p arp --ulog -nlgroup 5 -j DROP
ebtables -A FORWARD -p arp --ulog -nlgroup 5 -j DROP The above two ebtable rules filter the ARP packets to ulog group 5: therefore, the daemon can acquire these packets from netlink sockets, below is definition of group 5:

group=5
sa_local.nl_groups=1<<(group −1)
sa_local.nl_pid=getpid( )
nl_sock=socket    (PF_NETLINK,    SOCK_PAW, NETLINK_NFLOG);
...
rc=bind (nl_sock, (struct sockaddr*) (& sa_local), sizeof (sa_local));
...
len=recvfrom (nl_sock, buffer, BUFFER_LEN, 0, (struct sockaddr*) & sa_local, & addrlen);
...

The above codes show that the daemon parses the received ARP request and constructs an ARP response packet by using the received ARP request.

For VxLAN, the l2miss function thereof may be utilized, that is, VxLAN multicast is disabled. Thus, when an ARP request is received, netlink message in user space will be triggered, and a netlink response is expected to add the MAC address into VxLAN fdb. Therefore, the daemon only needs to listen to the netlink socket and gives a responded ARP response.

It should be appreciated that, although the above description is made by taking ARP for example, the present invention is also applicable to any network broadcast request for address resolution that might cause broadcast storm, such as Reverse Address Resolution Protocol (RARP), Dynamic Host Configuration Protocol (DHCP) and so on.

For example, for the Reverse Address Resolution Protocol (RARP), a virtual machine hypervisor receives a RARP request sent by a source virtual machine node, and acquires MAC address of a destination virtual machine node in the RARP request. Then, the virtual machine hypervisor reads a predefined mapping rule of an IP address and the MAC address, and according to that mapping rule, derives an IP address corresponding to the MAC address of the destination virtual machine node. For example, if the mapping rule is that the IP address of the node is the last four digits of the MAC address, then the IP address is derived by directly truncating the last four digits of the MAC address of the destination virtual machine node. Then the virtual machine hypervisor responds to the RARP request by using the derived IP address of the destination virtual machine node. Thus, the broadcasted RARP request is received by the virtual machine hypervisor and responded to directly without being delivered to the local network.

With reference now to FIG. 5, a block diagram of a system 500 for reducing network load in a software defined network according to an embodiment of the present invention is depicted. The system 500 comprises:

a receiving unit 502 configured to receive a network broadcast request sent by a source virtual machine node;

an acquiring unit 504 configured to acquire a first destination address in the network broadcast request;

a reading unit 506 configured to read a predefined mapping rule of the first destination address and a second destination address, wherein an address of a node in the software defined network is configured by using the predefined mapping rule;

a deriving unit 508 configured to derive the second destination address corresponding to the first destination address according to the mapping rule; and, a responding unit 510 configured to respond to the network broadcast request by using the derived second destination address.

According to one embodiment, the network broadcast request is an ARP, the first destination address is a destination IP address and the second destination address is a destination MAC address.

According to one embodiment, the network broadcast request is a DHCP, the first destination address is a destination MAC address and the second destination address is a destination IP address.

According to one embodiment, the predefined mapping rule of the first destination address and the second destination address is that: the second destination address may be directly derived from the first destination address.

According to one embodiment, the predefined mapping rule of the first destination address and the second destination address is that: the second destination address may be derived from the first destination address through a predefined conversion.

According to one embodiment, the receiving unit and the response unit are located in a daemon running on a virtual machine hypervisor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reducing network load in a software defined network, comprising:
receiving, by a daemon running on a virtual machine hypervisor, a network broadcast request sent by a source virtual machine node;
acquiring, by the daemon, a first destination address in the network broadcast request;
reading, by the daemon, a predefined mapping rule of the first destination address and a second destination address, wherein an address of a node in the software defined network is configured by using the predefined mapping rule;
deriving, by the daemon, the second destination address corresponding to the first destination address according to the predefined mapping rule; and
responding, by the daemon, to the network broadcast request by using the derived second destination address,
wherein the network broadcast request is received and responded to by the daemon running on the virtual machine hypervisor directly without the network broadcast request being delivered to a local area network.

2. The method according to claim 1, wherein:
the network broadcast request is an Address Resolution Protocol (ARP) request, the first destination address is a destination Internet Protocol (IP) address and the second destination address is a destination Media Access Control (MAC) address.

3. The method according to claim 2, wherein the predefined mapping rule of the first destination address and the second destination address comprises complementing a virtual network number of a local network where the IP address is located before the IP address to form the MAC address.

4. The method according to claim 2, wherein the predefined mapping rule of the first destination address and the second destination address comprises complementing a virtual network number of a local network where the IP address is located before a result of negating the IP address to form the MAC address.

5. The method according to claim 1, wherein:
the network broadcast request is a Dynamic Host Configuration Protocol (DHCP) request, the first destination address is a destination MAC address and the second destination address is a destination IP address.

6. The method according to claim 5, wherein the predefined mapping rule of the first destination address and the second destination address comprises using the last four digits of the MAC address as the IP address.

7. The method according to claim 5, wherein the predefined mapping rule of the first destination address and the second destination address comprises using a result of negating the last four digits of the MAC address as the IP address.

8. The method according to claim 1, wherein the predefined mapping rule of the first destination address and the second destination address is that:
the second destination address is directly derived from the first destination address.

9. The method according to claim 1, wherein the predefined mapping rule of the first destination address and the second destination address is that:
the second destination address is derived from the first destination address through a predefined conversion.

10. The method according to claim 1, wherein the daemon uses bridging firewall tool etables and wherein receiving the network broadcast request comprises intercepting, by the daemon, the network broadcast request using ebtables hooks.

11. A virtual machine management system for reducing network load in a software defined network, comprising:
a processor, and
a memory coupled to the processor, wherein the memory comprises instructions executed by the processor, wherein the instructions comprise a daemon running on a virtual machine hypervisor, the daemon comprising:
a receiving unit configured to receive a network broadcast request sent by a source virtual machine node;
an acquiring unit configured to acquire a first destination address in the network broadcast request;
a reading unit configured to read a predefined mapping rule of the first destination address and a second destination address, wherein an address of a node in the software defined network is configured by using the predefined mapping rule;
a deriving unit configured to derive the second destination address corresponding to the first destination address according to the predefined mapping rule; and
a responding unit configured to respond to the network broadcast request by using the derived second destination address,
wherein the receiving unit and the responding unit are in the daemon running on the virtual machine hypervisor directly without the network broadcast request being delivered to a local area network.

12. The system according to claim 11, wherein:
the network broadcast request is an ARP request, the first destination address is a destination IP address and the second destination address is a destination MAC address.

13. The system according to claim 11, wherein:
the network broadcast request is a DHCP request, the first destination address is a destination MAC address and the second destination address is a destination IP address.

14. The system according to claim 11, wherein the predefined mapping rule of the first destination address and the second destination address is that:
the second destination address is directly derived from the first destination address.

15. The system according to claim 11, wherein the predefined mapping rule of the first destination address and the second destination address is that:
the second destination address is derived from the first destination address through a predefined conversion.

16. A computer program product comprising a computer readable storage medium having a computer readable program stored therein, wherein the computer readable program, when executed on a computing device, causes the computing device to:
receive, by a daemon running on a virtual machine hypervisor, a network broadcast request sent by a source virtual machine node;
acquire, by the daemon, a first destination address in the network broadcast request;

read, by the daemon, a predefined mapping rule of the first destination address and a second destination address, wherein an address of a node in the software defined network is configured by using the predefined mapping rule;

derive, by the daemon, the second destination address corresponding to the first destination address according to the predefined mapping rule; and respond, by the daemon, to the network broadcast request by using the derived second destination address, wherein the network broadcast request is received and responded to by the daemon running on the virtual machine hypervisor directly without the network broadcast request being delivered to a local area network.

17. The computer program product according to claim 16, wherein:
the network broadcast request is an ARP request, the first destination address is a destination IP address and the second destination address is a destination MAC address.

18. The computer program product according to claim 16, wherein:
the network broadcast request is a DHCP, the first destination address is a destination MAC address and the second destination address is a destination IP address.

19. The computer program product according to claim 16, wherein the predefined mapping rule of the first destination address and the second destination address is that:
the second destination address is directly derived from the first destination address.

20. The computer program product according to claim 16, wherein the predefined mapping rule of the first destination address and the second destination address is that:
the second destination address is derived from the first destination address through a predefined conversion.

* * * * *